Sept. 20, 1938.   R. A. BABEL   2,130,868
BRAKE
Filed May 30, 1930    2 Sheets-Sheet 1
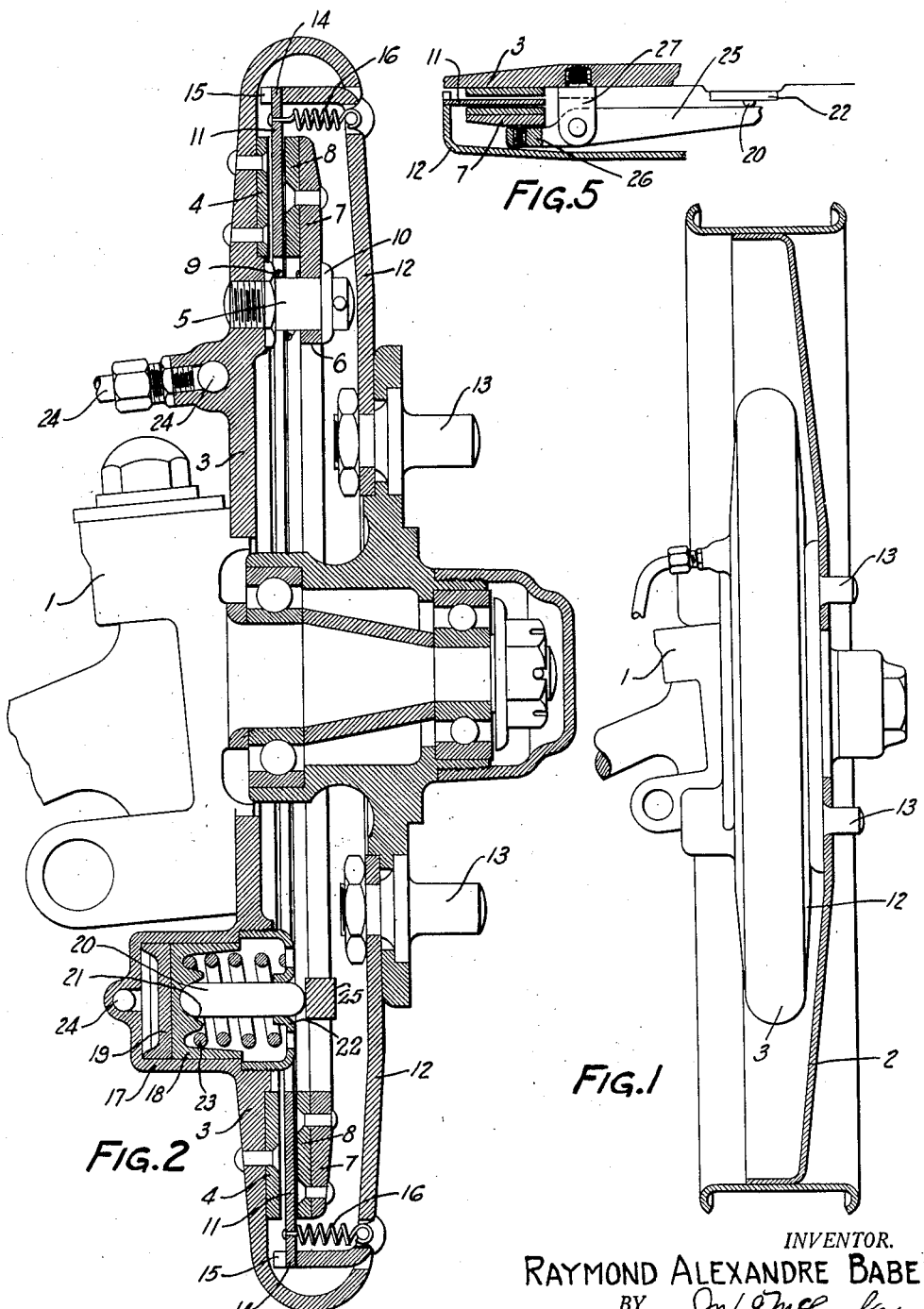
INVENTOR.
RAYMOND ALEXANDRE BABEL
BY M. W. McConkey
ATTORNEY Sept. 20, 1938.  R. A. BABEL  2,130,868
BRAKE
Filed May 30, 1930  2 Sheets-Sheet 2

INVENTOR.
RAYMOND ALEXANDRE BABEL
BY
ATTORNEY

Patented Sept. 20, 1938

2,130,868

UNITED STATES PATENT OFFICE 2,130,868

BRAKE

Raymond Alexandre Babel, Clichy, France, assignor to Bendix Brake Company, South Bend, Ind., a corporation of Illinois Application May 30, 1930, Serial No. 457,651
In France August 22, 1929

8 Claims. (Cl. 188—72)

The present invention has for its object producing a braking action in which the force exercised upon the part to be braked produces no other reaction than the torsion which is required for obtaining the braking effect, and thus the elements supporting the said part to be braked are not subjected to any prejudiciable stresses or reactions.

For this purpose, and according to the invention, the rotatable part to be braked is pressed upon both faces by novel non-rotatable elements. Although this principle may be applied to brakes of the type employing a drum with expanding segments or shoes, it is particularly advantageous when the rotatable and the non-rotatable parts have the general shape of disks which make contact upon their adjacent flat surfaces. In the illustrated construction, it is simply necessary to exercise a pressure upon one of the non-rotatable elements in order to operate the brake.

Another feature of the invention relates to novel operating mechanism for a brake of this type, preferably operated by fluid pressure, and shown as including novel power-multiplying levers operating the disks or their equivalents and operated by hydraulic cylinders and pistons or the like.

The accompanying drawings show, by way of example, one illustrative embodiment of the present invention.

Figure 1 is a section of a front automobile wheel provided with a braking device according to the present invention;

Figure 2 is a vertical section through the braking device;

Figure 5 is a section on the line V—V of Figure 3.

Figure 4:
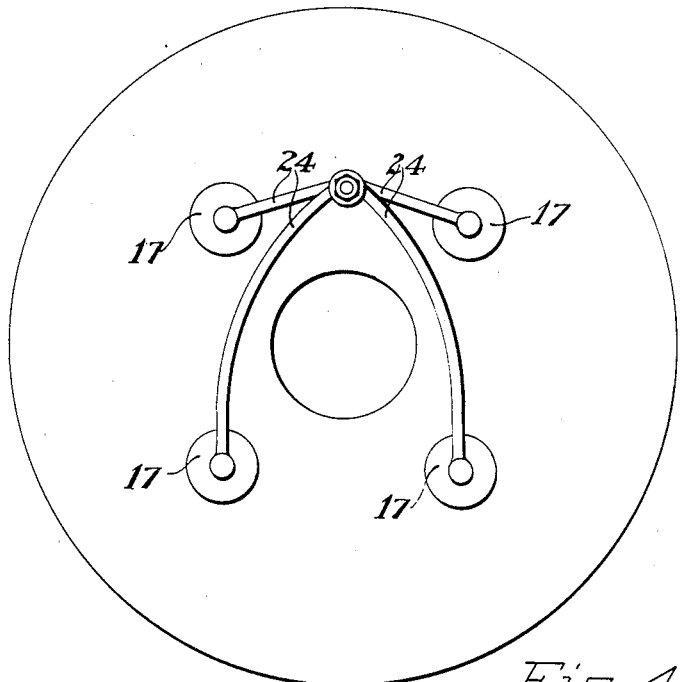
Figure 4 is an elevation of said device, viewed from the left of Figure 2.
Figure 3:
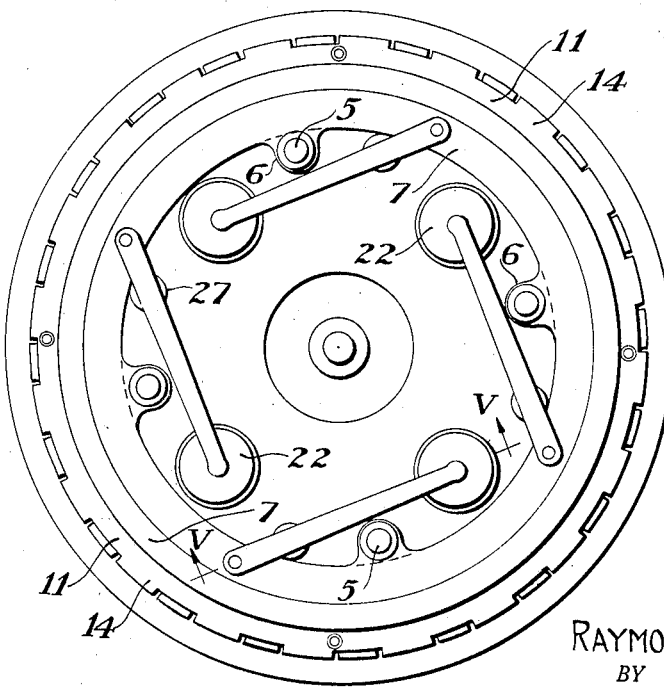
Figure 3 is an elevation of said device, viewed from the right of Figure 2, with the wheel removed.

To the knuckle 1, swiveled in the usual manner to the front axle, and carrying a wheel 2 of any suitable type, is rigidly secured a disk 3 provided with a facing ring 4 of a friction material. The disk 3 carries stationary means such as pins 5, upon which is slidably secured by lugs 6, a flat ring 7 carrying a facing ring 8 of friction material, facing toward the corresponding ring 4. Springs 9 surrounding the said pins 5 urge the ring 7 against stops 10 shown as provided on said pins 5. The disk 3 and the ring 7 are thus connected together by said pins, and are held against rotation. A steel disk 11 is rotated by a member 12 which participates in the rotation of the wheel 2 through the medium of attaching and driving members 13 connecting the member 12 to the wheel hub, and which also serve for attachment of the wheel to the hub. The disk 11 is driven by member 12 by means of teeth or keys 14 provided on the periphery of the disk 11 and cooperating with corresponding notches 15 formed around the circular edge of the member 12. It will be noted that this edge of member 12 extends within and is housed by the curled-over outer portion of the non-rotatable disk 3.

The disk 11 is movable between the friction rings 4 and 8, and the various parts are so adjusted as to allow a very small clearance between the disk 11 and the said rings 4 and 8. The disk 3 is preferably extended, as explained above, at its periphery in order to cover the member 12, so as to protect the braking device against dust and grit.

To operate the braking device, a pressure is exercised upon the face of the ring 7 opposite the one faced with the friction ring 8. Due to this pressure, the ring 7 and its friction ring 8 will slide upon the stationary pins 5, against the action of the springs 9, until it makes contact with the disk 11, and the latter is thus moved against the action of the springs 16, until it makes contact with the ring 4. When the pressure upon the ring 7 is released, the springs 9 will move the ring 7 back against the stops 10, and the springs 16 will move the teeth of the disk 11 into contact with the bottom of the notches 15.

This pressure on the ring 7 may be variously brought about, but an important feature of the invention resides in the illustrated construction in which a certain number of fluid-pressure cylinders 17, preferably forming part of a hydraulic system, are secured to the disk 3, being usually spaced uniformly around the wheel axis. In each cylinder, in the arrangement illustrated, is movable a metal piston 18 which is preferably provided with a concave disk 19 of plastic material affording a liquid seal. A thrust piece 20 is shown guided in each of the cylinders, on the one hand by a recess 21 in the piston 18 and on the other hand by a plug 22 forming a stop for a return spring 23 which urges the piston into the idle position at the end of the cylinder. The cylinders are connected together by piping 24 which is connected, in the case of a hydraulic system, to a master cylinder or pump supplying oil or the like, and controlled by the brake pedal. According to one feature of the invention, each of the thrust pieces 20 controls power-multiplying means such as a lever the two arms whereof are shown at 25—26 and which may be pivoted in a forked bracket 27 mounted on the disk 3 (Fig. 5), as close as possible to the point of contact between the arm 26 and the ring 7. Due to the difference in the lengths of the lever arms 25—26, the initial force exercised by the piston 20 will be much increased.

In this arrangement the disk 11 to be braked will be subjected to equal pressures on its respective faces, and these oppositely directed pressures will be mutually balanced during the braking action, so that no thrust will take place upon the ball bearings nor upon the wheel pivot. The only force exercised upon the said disk 11 consists in the torsion stress which is necessary for braking purposes. On the other hand, due to the aforesaid pressures upon both faces of the part to be braked, the device affords double the braking surfaces found in analogous types of brakes having the same diameter.

It is further to be noted that in the present arrangement, the braking action is the same for both directions of rotation. This braking action is gradual and progressive, due to the entire absence of self-braking or of dragging.

Since disks are used as braking members, the total thickness of the apparatus is reduced to a minimum.

It is obvious that numerous forms of construction may be based upon the aforesaid principles, without departing from the scope of the invention, and while one illustrative embodiment has been described in detail, it is not my intention to limit the scope of the invention to that particular embodiment or otherwise than by the terms of the appended claims.

I claim:

1. A brake comprising a rotatable member having a turned-over outer portion and a rotatable friction disk having its outer portion keyed to said turned-over portion, and co-operating non-rotatable friction parts including a disk having its outer portion formed to inclose said keyed-together portions.

2. A brake comprising a rotatable member having a flange provided with a plurality of notches in its edge, a rotatable friction disk having teeth positioned in the notches and non-rotatable friction parts associated therewith, including a backing plate having its periphery deformed to house the flange and the rotatable disk interconnected therewith.

3. A brake comprising a rotatable member having a flange provided with notches in its edge, a rotatable friction disk having teeth upon its periphery engaging the notches, and non-rotatable friction parts including a backing plate having its periphery deformed to house the flange of the rotatable member, and rotatable friction disk interconnected therewith.

4. A brake comprising a rotatable member having a flange provided with notches in its edge, a rotatable friction disk having teeth upon its periphery engaging the notches, and tension members connecting the friction disk to the rotatable member.

5. A brake comprising a rotatable member having a flange provided with notches in its edge, a friction disk having teeth upon its periphery positioned in the notches in the flange, means tending to seat the teeth on the friction disk in the notches in the flange, non-rotatable friction disks co-operating with the rotatable friction disk, and means for urging the non-rotatable friction disk away from the rotatable friction disk.

6. A brake comprising a fixed support having a rolled edge, friction elements on the support, a rotatable member associated with the fixed support having a flange provided with notches in its edge, the flange being housed by the rolled edge, a rotatable friction element positioned between the friction elements on the fixed support having an interlocking connection with the flange on the rotatable member, and means for engaging the non-rotatable friction element with the rotatable friction elements including levers fulcrumed on the fixed support and operated by force applying means carried on the fixed support.

7. A brake comprising a fixed support, a cylinder positioned thereon having one end closed, a guide member in the other end of the cylinder, a piston positioned for movement in the cylinder between the guide and the closed end, the piston having a recess, a thrust member having one of its ends seated in the recess and its other end embraced by the guide member.

8. A brake comprising a fixed support, a cylinder positioned thereon having one end closed, a guide in the other end of the cylinder, a piston positioned for movement in the cylinder between the guide and the closed end, the piston having a recess, a thrust member having one of its ends seated in the recess and its other end embraced by the guide member, and a spring in the cylinder between the piston and the guide member.

RAYMOND ALEXANDRE BABEL.